(12) United States Patent
Azimi et al.

(10) Patent No.: US 8,280,347 B2
(45) Date of Patent: Oct. 2, 2012

(54) METHOD AND APPARATUS FOR AUTOMATICALLY DAMAGING CIRCUITRY OF A MOBILE DEVICE WHEN ONE OR MORE CONDITIONS ARE DETECTED

(75) Inventors: Kouros Azimi, Center Valley, PA (US); Anthony J. Grewe, Fogelsville, PA (US)

(73) Assignee: LSI Corporation, Milpitas, CA (US)

( * ) Notice: Subject to any disclaimer, the term of this patent is extended or adjusted under 35 U.S.C. 154(b) by 510 days.

(21) Appl. No.: 12/507,239

(22) Filed: Jul. 22, 2009

(65) Prior Publication Data

US 2011/0021174 A1    Jan. 27, 2011

(51) Int. Cl.
   *H04M 1/66* (2006.01)
(52) U.S. Cl. ......................... 455/410; 455/418; 455/26.1
(58) Field of Classification Search .................. 455/450, 455/509, 16, 62, 445, 522, 551, 410, 418, 455/26.1; 370/280, 342; 375/211, E1.032, 375/219; 323/283; 307/31; 264/328.3, 328.5
   See application file for complete search history.

(56) References Cited

U.S. PATENT DOCUMENTS

| | | | |
|---|---|---|---|
| 7,653,394 B2* | 1/2010 | McMillin | 455/444 |
| 7,660,284 B1* | 2/2010 | Prudent | 370/338 |
| 2002/0108046 A1* | 8/2002 | Armingaud | 713/183 |
| 2007/0008169 A1* | 1/2007 | Conero et al. | 340/825.69 |
| 2007/0261112 A1* | 11/2007 | Todd et al. | 726/11 |
| 2009/0209196 A1* | 8/2009 | Haverty | 455/1 |
| 2009/0247131 A1* | 10/2009 | Champion et al. | 455/411 |
| 2009/0273435 A1* | 11/2009 | Ould | 340/5.2 |
| 2010/0216429 A1* | 8/2010 | Mahajan | 455/411 |

OTHER PUBLICATIONS

Coming Soon: The 3G Kill Switch, LAPTOP Magazine, Apr. 2009, p. 93.

* cited by examiner

*Primary Examiner* — Jean Gelin
*Assistant Examiner* — Mahendra Patel

(57) ABSTRACT

A mobile device is configured with electrical circuitry that causes the transmit channel electrical circuitry of the transmitter (Tx) of the mobile device to be electrically coupled to the receive channel electrical circuitry of the receiver (Rx) of the mobile device when one or more predetermined conditions occur. The electrical coupling of the transmit channel circuitry to the receive channel circuitry causes the Rx to be sufficiently damaged to render the mobile device nonoperational, thereby preventing further use of the mobile device. The one or more predetermined conditions correspond to conditions that indicate the mobile device has been lost or stolen and/or that an unauthorized user is attempting to use the mobile device in some manner.

19 Claims, 4 Drawing Sheets

METHOD AND APPARATUS FOR AUTOMATICALLY DAMAGING CIRCUITRY OF A MOBILE DEVICE WHEN ONE OR MORE CONDITIONS ARE DETECTED

TECHNICAL FIELD OF THE INVENTION

The invention relates to mobile devices, such as, for example, mobile telephones and personal digital assistants (PDAs). More particularly, the invention relates to a method and an apparatus for automatically damaging circuitry of a mobile device to render the circuitry inoperable if one or more particular conditions are detected.

BACKGROUND OF THE INVENTION

Mobile devices such as wireless telephones and PDAs, for example, allow subscribers of a wireless service provider to wirelessly transmit and receive telephone calls, email messages, text messages, and various types of content over wireless networks. Most mobile devices in use today provide users with the ability to input and store various types of data, such as, for example, telephone numbers, names, addresses, schedules, photographs, etc. Such mobile devices generally include some type of computer processing device that functions as a central processing unit (CPU) and some type of memory device for storing various types of data, network settings, personal passwords, content (e.g., photographs), and other types of information. In addition, some mobile devices implement near-field communication technology, which allows a subscriber's credit card information to be stored in the mobile device so that the mobile device is able to make contactless payments with a point-of-purchase (POP) terminal.

When a mobile device is lost or stolen, a person who finds or who has stolen the mobile device may be attempt to use the mobile device and/or to access information stored in the memory device of the mobile device. To prevent unauthorized users from being able to access information stored in the memory device, some mobile devices provide the subscriber with the ability to configure the mobile device with a password that prevents an unauthorized user from accessing information stored in the memory device and/or from using the mobile device to access the wireless network. However, various techniques can be used to hack into a mobile device even if the subscriber has password protected the mobile device. Therefore, password protecting a mobile device is not totally effective at preventing unauthorized users from using the mobile device and/or from accessing information stored in the memory device of the mobile device.

A subscriber identity module (SIM) card is a component of a mobile device that is configured to operate wirelessly over a Global System for Mobile Communications (GSM) network. GSM is an international wireless standard that is used around the world. Each SIM card has a unique number stored in it, known as the International Mobile Subscriber Identity (IMSI) number, which identifies the subscriber's account information to the GSM network and allows the network to determine a rate plan and billing information to be used. SIM cards are completely interchangeable between Mobile devices configured to operate over GSM networks to provide greater flexibility of devices on GSM networks than CDMA allows on its networks. The SIM card is typically contained in a slot behind the direct current (dc) power supply of the mobile device. The SIM card can be easily removed by first removing the battery supply and then removing the SIM card from the slot. After the SIM card has been removed, it can be reinserted into the slot or replaced with a different SIM card that is inserted into the slot.

The IMSI number is transmitted wirelessly along with other information from the mobile device to the wireless network when the user attempts to setup a session (e.g., place a telephone call, transmit an email message, transmit a text message, etc.). The IMSI number is typically also periodically transmitted by the mobile device to the network to enable the network to ascertain the geographical location of the mobile device in real-time. Equipment within the network receives the IMSI number and compares it with a list of authorized IMSI numbers associated with authorized subscribers to determine whether or not the IMSI number corresponds to an authorized subscriber, i.e., a subscriber who is authorized to access the network. If the network equipment determines that the received IMSI number does not correspond to an authorized subscriber, the network will not allow the mobile device to communicate over the network.

Typically, when a subscriber realizes that his or her mobile device has been lost or stolen, the subscriber will contact the wireless service provider and inform the provider that the mobile device has been lost or stolen. The service provider typically will then "tag" the mobile device as being lost or stolen and remove the IMSI number from the list of authorized IMSI numbers. Subsequently, if an unauthorized user attempts to setup a call session using the lost or stolen mobile device, the network will determine that the mobile device is no longer authorized and therefore will not allow the call session to occur. However, if the unauthorized user replaces the SIM card that is in the mobile device with a different SIM card that is authorized on the network, such as a pre-paid SIM card, the unauthorized user will often be able to access the network.

While the aforementioned techniques provide some protection against unauthorized persons using a lost or stolen mobile device and/or accessing information stored in the mobile device, those techniques do not guarantee that an unauthorized person will be prevented from using and/or accessing information stored in a lost or stolen mobile device. Accordingly, a need exists for a way to guarantee that an unauthorized user of a lost or stolen mobile device will be prevented from using the mobile device over a wireless network and from accessing information stored in the mobile device.

SUMMARY OF THE INVENTION

The invention provides a mobile device the employs an apparatus and one or more methods for preventing unauthorized use of the mobile device. The mobile device comprises a receiver (Rx), a transmitter (Tx), a memory device, a switching circuit, and a processing device. The Rx is configured to receive radio frequency (RF) signals transmitter over air from a wireless network. The Rx includes receiver electrical circuitry that provides a receive channel for receiving the received RF signals. The Tx is configured to output RF signals for transmission over air from the mobile device to the wireless network. The Tx includes transmitter electrical circuitry that provides a transmit channel for outputting an RF signal to be transmitted over air from the mobile device to the wireless network. The memory device is configured to store data and computer code. The switching circuit is coupled to the receive channel of the Rx and to the transmit channel of the Tx and is switchable between at least a first switching state in which the switching circuit is opened and a second switching state in which the switching circuit is closed. In the second switching state, the transmit channel is electrically connected to the receive channel such that an RF signal output on the transmit channel is received on the receive channel with sufficient power to sufficiently damage at least part of the receiver electrical circuitry to thereby render the Rx inoperable. The processing device is configured to perform at least one algorithm that controls the switching circuit. The algorithm determines whether or not at least one predetermined condition has occurred, and if so, causes the switching circuit to be switched to the second switching state.

The method comprises performing at least one algorithm in a processing device of a mobile device to determine whether or not at least one predetermined condition has occurred, and if so, causing a switching circuit of the mobile device to be switched from a first switching state to a second switching state. The switching circuit is coupled to a receive channel of an Rx of the mobile device and to a transmit channel of a Tx of the mobile device. The switching circuit is opened in the first switching state and closed in the second switching state. In the second switching state, the transmit channel is electrically connected to the receive channel such that an RF signal output on the transmit channel is received on the receive channel with sufficient power to sufficiently damage at least part of the receiver electrical circuitry to thereby render the Rx inoperable.

The invention further provides a computer-readable medium having a computer program stored thereon for use in a processing device of a mobile device to prevent unauthorized use of the mobile device. The program comprises at least a first set of instructions and a second set of instructions. The first set of instructions performs at least a first algorithm in the mobile device to determine whether or not at least one predetermined condition has occurred. The second set of instructions performs at least a second algorithm in the mobile device if the first set of instructions determines that the predetermined condition has occurred. In performing the second algorithm, the second set of instructions causes a switching circuit of the mobile device to be switched from a first switching state to a second switching state. The switching circuit is coupled to a receive channel of an Rx of the mobile device and to a transmit channel of a Tx of the mobile device. The switching circuit is opened in the first switching state and is closed in the second switching state. In the second switching state, the transmit channel is electrically connected to the receive channel such that an RF signal output on the transmit channel is received on the receive channel with sufficient power to sufficiently damage at least part of the receiver electrical circuitry to thereby render the Rx inoperable.

The invention further provides a wireless network configured to prevent an unauthorized user from using a wireless device. The network comprises at least a first network element and a second network element. The first network element is configured to perform at least a first algorithm that determines whether or not at least one predetermined condition has occurred that indicates that a particular mobile device has been lost or stolen. The second network element is configured to perform at least a second algorithm that causes an Rx destroy (Destroy_Rx) command to be sent from the wireless network to a mobile device that the first algorithm has determined to be lost or stolen. The Destroy_Rx command commands the particular mobile device to electrically connect a transmit channel of a Tx of the mobile device to a receive channel of an Rx of the mobile device such that an RF signal output on the transmit channel is received on the receive channel with sufficient power to sufficiently damage electrical circuitry of the Rx to thereby render the Rx inoperable.

The invention further provides a method performed by a wireless network to prevent an unauthorized user from using a wireless device. The method comprises performing at least a first algorithm in a first network element of the wireless network and a second algorithm in a second network element of the wireless network. The first algorithm determines whether or not at least one predetermined condition has occurred that indicates that a particular mobile device has been lost or stolen. The second algorithm causes an Destroy_Rx command to be sent from the wireless network to a mobile device that the first algorithm has determined to be lost or stolen. The Destroy_Rx command commands the particular mobile device to electrically connect a transmit channel of a Tx of the mobile device to a receive channel of an Rx of the mobile device such that an RF signal output on the transmit channel is received on the receive channel with sufficient power to sufficiently damage electrical circuitry of the Rx to thereby render the Rx inoperable.

The invention further provides a computer-readable medium having a computer program stored thereon for use in a wireless network to prevent unauthorized use of the mobile device. The program comprises at least a first set of instructions and a second set of instructions. The first set of instructions performs at least a first algorithm that determines whether or not at least one predetermined condition has occurred that indicates that a particular mobile device has been lost or stolen. The second set of instructions performs at least a second algorithm that causes an Destroy_Rx command to be sent from the wireless network to a mobile device that the fist set of instructions has determined to be lost or stolen. The Destroy_Rx command commands the particular mobile device to electrically connect a transmit channel of a Tx of the mobile device to a receive channel of an Rx of the mobile device such that an RF signal output on the transmit channel is received on the receive channel with sufficient power to sufficiently damage electrical circuitry of the Rx to thereby render the Rx inoperable.

These and other features and advantages of the invention will become apparent from the following description, drawings and claims.

DETAILED DESCRIPTION OF ILLUSTRATIVE EMBODIMENTS

In accordance with the invention, a mobile device is configured with electrical circuitry that causes the transmit channel electrical circuitry of the transmitter (Tx) of the mobile device to be electrically coupled to the receive channel electrical circuitry of the receiver (Rx) of the mobile device when one or more predetermined conditions occur. The electrical coupling of the transmit channel circuitry to the receive channel circuitry causes the Rx to be sufficiently damaged to render the mobile device nonoperational, thereby preventing further use of the mobile device.

In accordance with one illustrative embodiment, the predetermined condition that occurs to cause the Tx channel circuitry to be electrically coupled to the Rx channel circuitry is an element or component of the wireless network making a determination that a mobile device that has been tagged by the network as being lost or stolen has attempted to access the network. When the network element determines that this condition has occurred, the network sends a message containing a destruct command to the lost or stolen mobile device. Electrical circuitry within the mobile device decodes the destruct command and causes the Tx channel circuitry to be electrically coupled to the Rx channel circuitry with sufficient electrical power to damage the Rx channel circuitry, thereby rendering the Rx channel circuitry nonoperational.

In accordance with another illustrative embodiment, the predetermined condition is an incorrect user password entered more than a predetermined number of times on the input panel of the mobile device. If this condition is detected by electrical circuitry within the mobile device, the electrical circuitry causes the Tx channel circuitry to be electrically coupled to the Rx channel circuitry with sufficient electrical power to damage the Rx channel circuitry, thereby rendering the Rx channel circuitry nonoperational.

In accordance with another illustrative embodiment, the predetermined condition is the mobile device attempting unsuccessfully to connect to the network more than a predetermined number of times. If an element or component of the wireless network makes a determination that a mobile device has attempted unsuccessfully to access the wireless network more than a predetermined number of times, the network sends a message containing a destruct command to the mobile device. Electrical circuitry within the mobile device decodes the destruct command and causes the Tx channel circuitry to be electrically coupled to the Rx channel circuitry with sufficient electrical power to damage the Rx channel circuitry, thereby rendering the Rx channel circuitry nonoperational.

Figure 1:
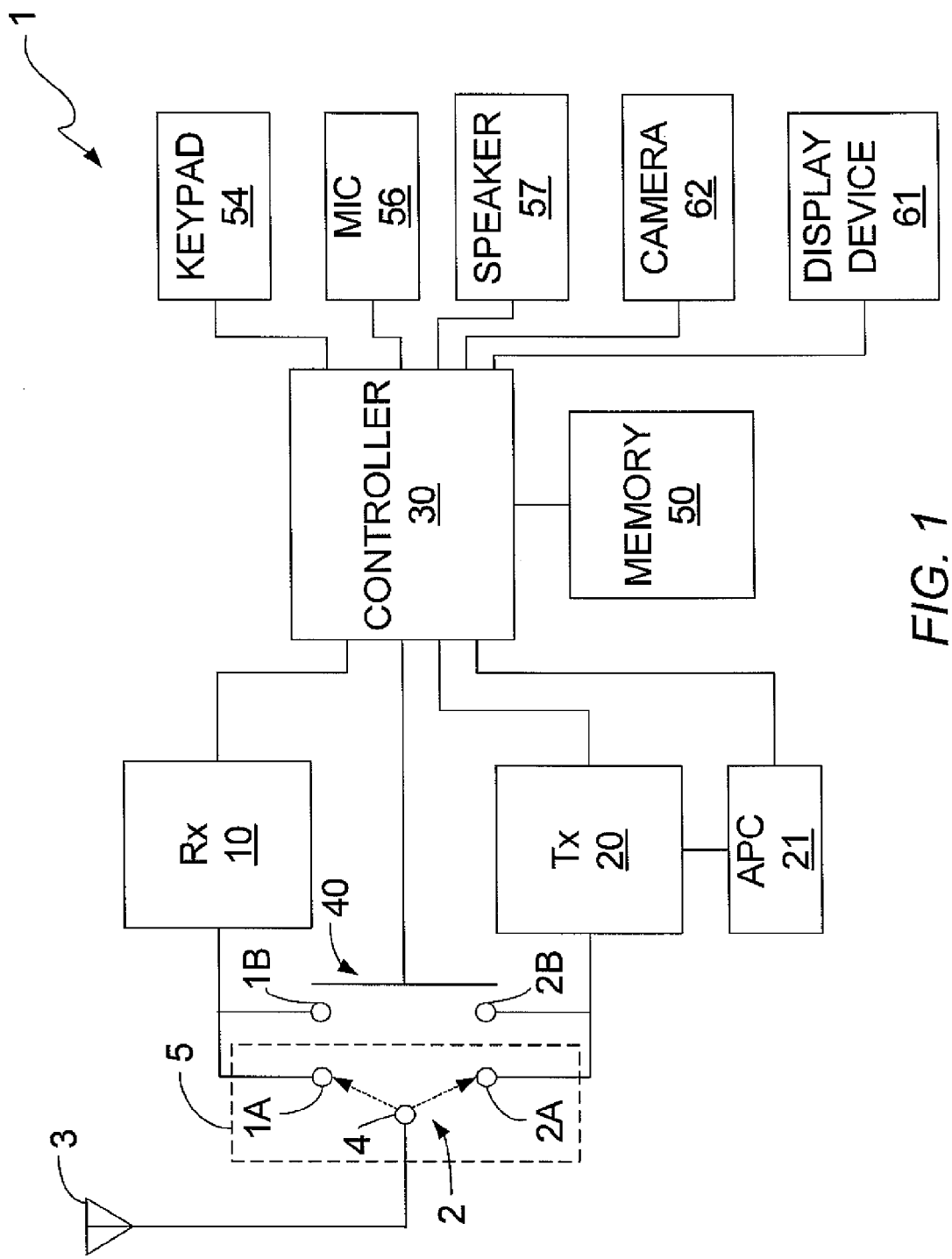
FIG. 1 illustrates a block diagram of a mobile device that incorporates the apparatus and methods of the invention in accordance with an illustrative, or exemplary, embodiment.

FIG. 1 illustrates a block diagram of the electrical components of a mobile device 1 that is configured to perform one or more methods of the invention. It should be noted, however, that the invention is not limited with respect to the type of mobile device or configuration of the mobile device with which the methods and apparatuses of the invention are implemented. The mobile device 1 shown in FIG. 1 is only one example of a mobile device that has been configured to implement the methods and apparatuses of the invention. For ease of illustration and discussion, it will be assumed that the mobile device 1 is a mobile telephone configured to communicate over a wireless network, such as a GSM wireless network, for example. It should be noted, however, that the invention is not limited with respect to the type of wireless network or the type of communications protocol with which the invention is implemented. For example, the invention could also be used with wireless Code Division Multiple Access (CDMA) networks and mobile devices that operate on those networks.

With reference to FIG. 1, the mobile device 1 includes a first switch 2, an antenna 3, a Rx 10, a Tx 20, an automatic power control (APC) circuit 21, a controller 30, a second switch 40, a memory device 50, a keypad 54, a microphone 56, and a speaker 57. In addition, the mobile device 1 typically also includes a display device 61, such as a liquid crystal display (LCD) device, and may include a camera 62. Although not shown in FIG. 1 for ease of illustration, the mobile device 1 includes a DC power supply, an AC-to-DC switching module, and a DC power supply recharger.

The controller 30 is a central processing unit (CPU) of the mobile device 1 and is typically a processor, such as a microprocessor, a microcontroller, or application specific integrated circuit (ASIC), for example. The controller 30 typically includes well known logic for performing various functions associated with demodulation, equalization, audio coding and decoding (CODEC), and network interfacing. Various software and/or firmware code associated with these and other known functions provided by the controller 30 is typically stored in memory device 50 and accessed and executed by the controller 30.

The first switch 2 is switchable between an Rx switch position in which the mobile device 1 is in a receive mode, and a Tx position in which the mobile device 1 is in a transmit mode. In the receive mode, the switch terminal 4 is connected to the Rx terminal 1A. In the transmit mode, the switch terminal 4 is connected to the Tx terminal 2A. Thus, in the receive mode, the first switch 2 electrically connects the Rx 10 with the antenna 3 to enable the Rx 10 to receive radio frequency (RF) electromagnetic signals transmitted over an air interface between a wireless network (not shown) and the antenna 3 of the mobile device 1. The wireless RF signals are detected by the antenna 3, which provides corresponding RF electrical signals over one or more electrical conductors (not shown) to the Rx 10. The Rx 10 then performs typical Rx operations, such as baseband filtering, demodulation and decoding of the received RF signal. Similarly, in the transmit mode, the first switch 2 electrically connects the Tx 20 with the antenna 3 to enable the Tx 20 to transmit RF signals over the air interface from the antenna 3 to a wireless network (not shown). The Tx 20 performs typical Tx operations, such as baseband filtering, coding and modulation operations typically used to generate wireless RF signals. The controller 30 controls the APC 21 to cause amplification circuitry (not shown) within the Tx 20 to increase the gain of the RF signal to a suitable level for transmission. The Rx 10 and the Tx 20 include known electrical components for performing the respective receive and transmit functions, such as, for example, baseband filters (not shown), phase locked loops (PLLs) (not shown), voltage controlled oscillators (VCOs) (not shown), etc.

Although the mobile device 1 has been described above as either being in the transmit mode or in the receive mode at a given instant in time, mobile devices typically have duplexer circuitry that enable them to simultaneously transmit and receive RF signals in the Tx and Rx, respectively. Therefore, the above description of the transmit and receive modes is a simplification of the transmit and receive processes and is intended only to demonstrate the general operations of the mobile device 1. The dashed box 5 shown in FIG. 1 is intended to denote a duplexer circuit that enables the mobile device 1 to simultaneously transmit RF signals produced by the Tx 20 and receive RF signals in the Rx 10 transmitted from the wireless network.

All of the operations described above thus far with reference to FIG. 1 are the typical operations currently performed by a mobile device, such as a wireless telephone. However, as indicated above, in addition to the known functionality provided by the controller 30, the controller 30 is configurable to perform one or more algorithms to cause the mobile device 1 to perform one or more methods of the invention. These algorithms will typically be implemented in software, firmware, or a combination thereof. The corresponding software and/or firmware is stored in memory device 50 and accessed and executed by the controller 30. In addition, the mobile device 1 comprises a switch 40 that is controlled by the controller 30 when the controller is executing one or more of the aforementioned algorithms, as will now be described with further reference to FIG. 1.

With reference again to FIG. 1, if one of the aforementioned predetermined conditions occurs, the controller 30 causes the second switch 40 to switch to a Destroy_Rx position in which terminals 1B and 2B are electrically connected to one another. When terminals 1B and 2B are electrically connected to one another, the RF signal power provided by the Tx 20 is directed into the Rx 10. Because the Rx 10 typically includes sensitive electrical elements, such as, for example, semiconductor logic gates (e.g., Complimentary Metal Oxide Semiconductor (CMOS) logic gates), directing the RF signal power from the Tx 20 into the Rx 10 sufficiently damages the electrical circuitry of the RX 10 to render the mobile device 1 nonoperational. If needed, the controller 30 will cause the APC 21 to increase the power level of the RF signal transmitted from terminal 2B of the of the Tx 20 to terminal 1B of the Rx 10 to ensure that the power level of the RF signal is sufficiently high to sufficiently damage the Rx 10 and render it nonoperational.

Figure 2:
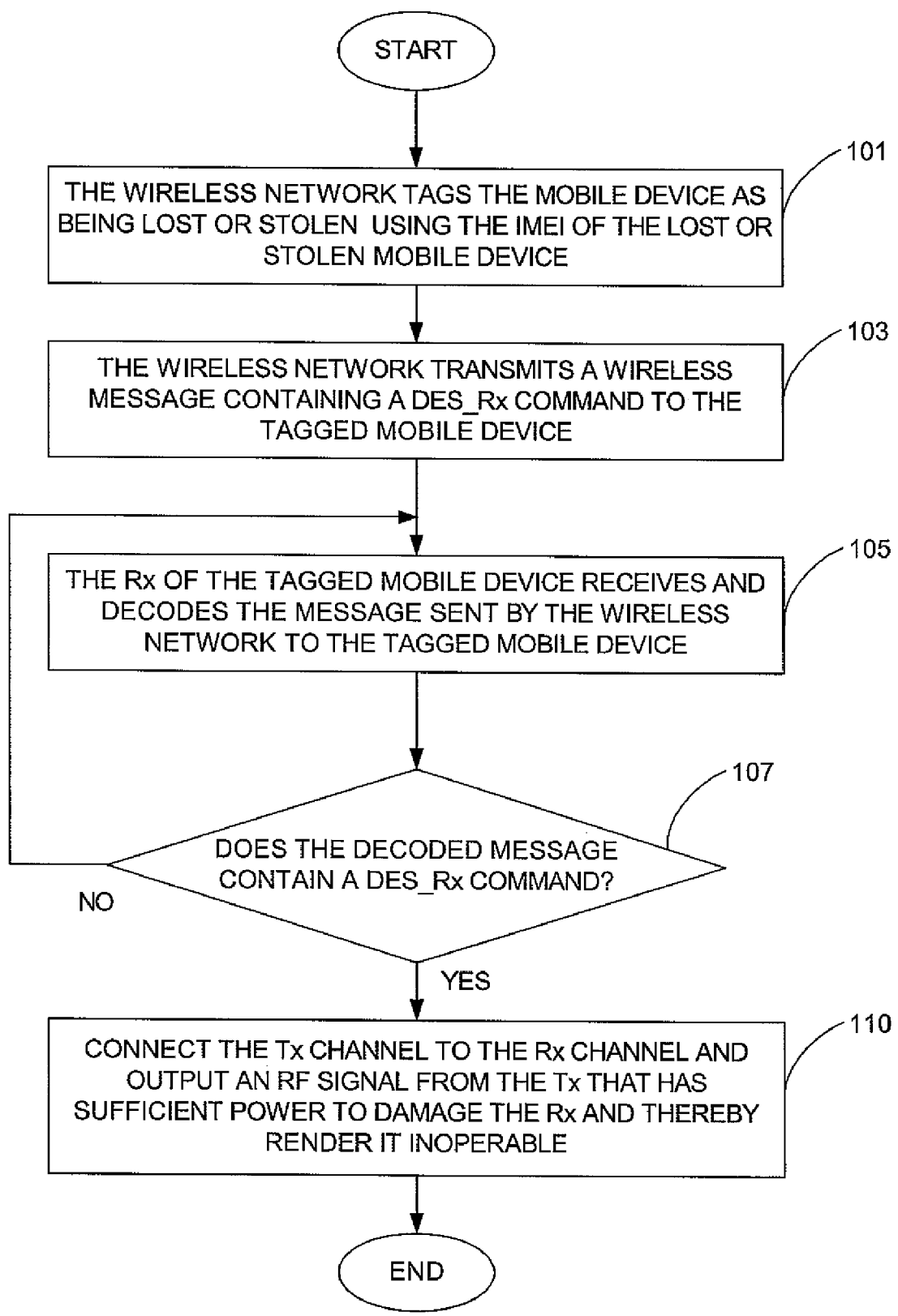
FIG. 2 illustrates a flowchart that represents a first illustrative embodiment in which the predetermined condition is an attempt by a mobile device that has been tagged by the network as being lost or stolen attempts to access the network.

As mentioned above, in accordance with embodiments of the invention, a determination is made as to whether one or more predetermined conditions have occurred. If so, the controller 30 causes the switch 40 to be placed in the Destroy_Rx position to cause the Tx 20 to be directly connected to the Rx 10 such that an RF signal having sufficient power to damage the Rx channel circuitry and render it nonoperational is coupled directly into the Rx channel. FIG. 2 illustrates a flowchart that represents a first illustrative embodiment in which the predetermined condition is an attempt by a mobile device that has been tagged by the network as being lost or stolen attempts to access the network. The embodiment of the method represented by the flowchart of FIG. 2 will now be described with reference to FIGS. 1 and 2, and it will be assumed that the mobile device 1 shown in FIG. 1 is a lost or stolen mobile device.

In accordance with this embodiment, when a subscriber reports the mobile device 1 as lost or stolen to the network service provider, the service provider causes an element or component of the network to "tag" the mobile device 1 by placing an International Mobile Equipment Identifier (IMEI) number associated with the mobile device 1 on a list of IMEI numbers associated with mobile devices that have been reported lost or stolen, as indicated by block 101. The IMEI number is a 15-digit number that uniquely identifies a mobile device 1. In most wireless networks, the IMEI currently is automatically transmitted by the by the mobile device 1 when the network requests it.

After the mobile device 1 has been tagged as lost or stolen, the network transmits a message containing a Destroy_Rx command to the tagged mobile device 1, as indicated by block 103. The tagged mobile device 1 receives the message containing the Destroy_Rx command and decodes the message, as indicated by block 105. The controller 30 of the mobile device 1 determines whether the received message contains a Destroy_Rx command, as indicated by block 107. If not, the process returns to the step represented by block 105. If so, the controller 30 causes the switch 40 to switch to the Destroy_Rx position in which terminals 1B and 2B are electrically connected to one another, as indicated by block 110. This direct electrical connection causes the electrical circuitry of the Rx 10 to be damaged sufficiently to render the Rx 10 nonoperational.

When the switch 40 is switched to the Destroy_Rx position, the power level of the RF signal that is electrically coupled from the Tx 20 into the Rx 10 may or may not be sufficiently high to damage circuitry of the RX 10 to the extent that the Rx 10 is rendered nonoperational, depending on the design of the mobile device 1. In the event that the power of the RF signal is not sufficiently high when the switch 40 is initially switched to the Destroy_Rx position, the controller 30 will cause the APC circuit 21 to increase the power of the RF signal output from the Tx 20 until the power of the RF signal is sufficiently high to cause damage to the Rx 10 such that the Rx 10 is rendered nonoperational. Therefore, as part of the step represented by block 110, or as an additional optional step that is not shown, the controller 30 determines whether the power of the RF signal output from the Tx 20 is sufficiently high to render the Rx 10 nonoperational, and if not, causes the APC 21 to increase the gain of the RF signal to a level that is sufficiently high to damage the Rx 10 and render it nonoperational. As another alternative, the controller 30 may simply cause the APC 21 to increase the gain of the RF signal output from the Tx 20 until the RF signal is at its maximum power level to ensure that the RF signal has sufficient power to sufficiently damage the Rx 10 such that it is rendered nonoperational.

Figure 3:
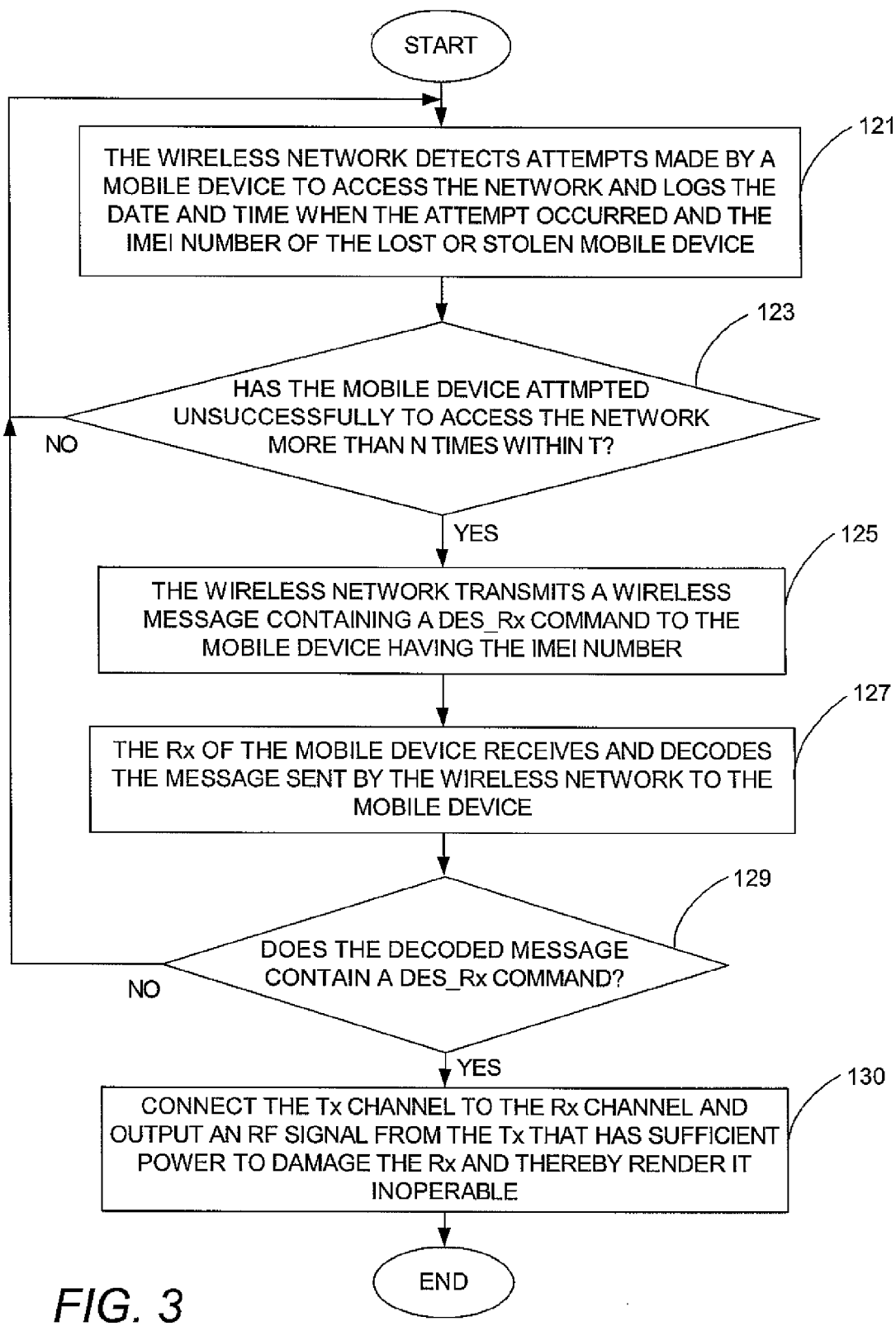
FIG. 3 illustrates a flowchart that represents the method of the invention in accordance with another illustrative embodiment in which the predetermined condition is a mobile device attempting, unsuccessfully, to access a wireless network more than a predetermined number of times during a predetermined time interval.

FIG. 3 illustrates a flowchart that represents the method of the invention in accordance with another illustrative embodiment in which the predetermined condition is the mobile device 1 attempting, unsuccessfully, to access a wireless network more than a predetermined number of times during a predetermined time interval. This embodiment will be described with reference to FIGS. 1 and 3. As is known in wireless networks, when a mobile device attempts to access a wireless network, the mobile device sends a message to the wireless network that includes the 15-digit IMEI number of the mobile device. In the step represented by block 121 in FIG. 3, a network element of the wireless network detects when a mobile device attempts, unsuccessfully, to access the wireless network and logs the date and time when the attempt occurred as well as the IMEI number of the mobile device. In the step represented by block 123, a network element of the wireless network uses the information logged in the step represented by block 121 to determine whether the mobile device associated with the IMEI number has attempted, unsuccessfully, to access the wireless network more than a predetermined number, N, of times within a predetermined time interval, T, where N is a positive integer and T is a positive number representing time in seconds. The value of N is preselected and is typically 3 or greater. If at the step represented by block 123 it is not determined that the mobile device has attempted unsuccessfully to access the network more than N times within T, the process returns to the step represented by block 121. If at the step represented by block 123 it is determined that the mobile device has attempted unsuccessfully to access the network more than N times within T, the process proceeds to block 125.

At block 125, the network transmits a message containing a Destroy_Rx command to the mobile device identified by the IMEI number. Assuming the mobile device 1 shown in FIG. 1 is the mobile device that made the unsuccessful attempts to access the network, the mobile device 1 receives the message containing the Destroy_Rx command and decodes the message, as indicated by block 127. The controller 30 of the mobile device 1 then determines whether the received message contains a Destroy_Rx command, as indicated by block 129. If not, the process returns to the step represented by block 121. If so, the controller 30 causes the switch 40 to switch to the Destroy_Rx position in which terminals 1B and 2B are electrically connected to one another, as indicated by block 130. This direct electrical connection causes the electrical circuitry of the Rx 10 to be damaged sufficiently to render the Rx 10 nonoperational.

As indicated above, when the switch 40 is switched to the Destroy_Rx position, the power level of the RF signal that is electrically coupled from the Tx 20 into the Rx 10 may or may not be sufficiently high to damage circuitry of the Rx 10 to the extent necessary to render it nonoperational, depending on the design of the mobile device 1. With reference again to FIG. 3, in the event that the power level of the RF signal is not sufficiently high when the switch 40 is initially switched to the Destroy_Rx position, the controller 30 will cause the APC circuit 21 to increase the power of the RF signal output from the Tx 20 until the power of the RF signal is sufficiently high to cause damage to the Rx 10 such that the Rx 10 is rendered nonoperational. Therefore, as part of the step represented by block 130, or as an additional optional step that is not shown in FIG. 3, the controller 30 determines whether the power level of the RF signal output from the Tx 20 is sufficiently high to render the Rx 10 nonoperational, and if not, causes the APC 21 to increase the power level of the RF signal to a level that is sufficiently high to damage the Rx 10 such that it is rendered nonoperational. As another alternative, the controller 30 may simply cause the APC 21 to increase the power level of the RF signal output from the Tx 20 until the RF signal is at its maximum power level to ensure that the RF signal has sufficient power to render the Rx 10 nonoperational.

It should be noted with reference to FIGS. 2 and 3 that, in accordance with those embodiments, part of the algorithm is performed by one or more elements or components of the wireless network and part of the algorithm is performed by the mobile device. For example, with reference to FIG. 2, the steps represented by blocks 101 and 103 are performed by the network and the steps represented by blocks 105, 107 and 110 are performed by the mobile device. Similarly, with reference to FIG. 3 the steps represented by blocks 121, 123 and 125 are performed by the network and the steps represented by blocks 127, 129 and 130 are performed by the mobile device. Therefore, these separate parts of the algorithms could be presented as separate flowcharts to indicate that parts of the algorithms are performed by the mobile devices and other parts are performed by the networks. A single flowchart is used for both parts of the algorithms shown in FIGS. 2 and 3 simply to demonstrate the general sequence of actions and decisions that are performed by the algorithms.

Figure 4:
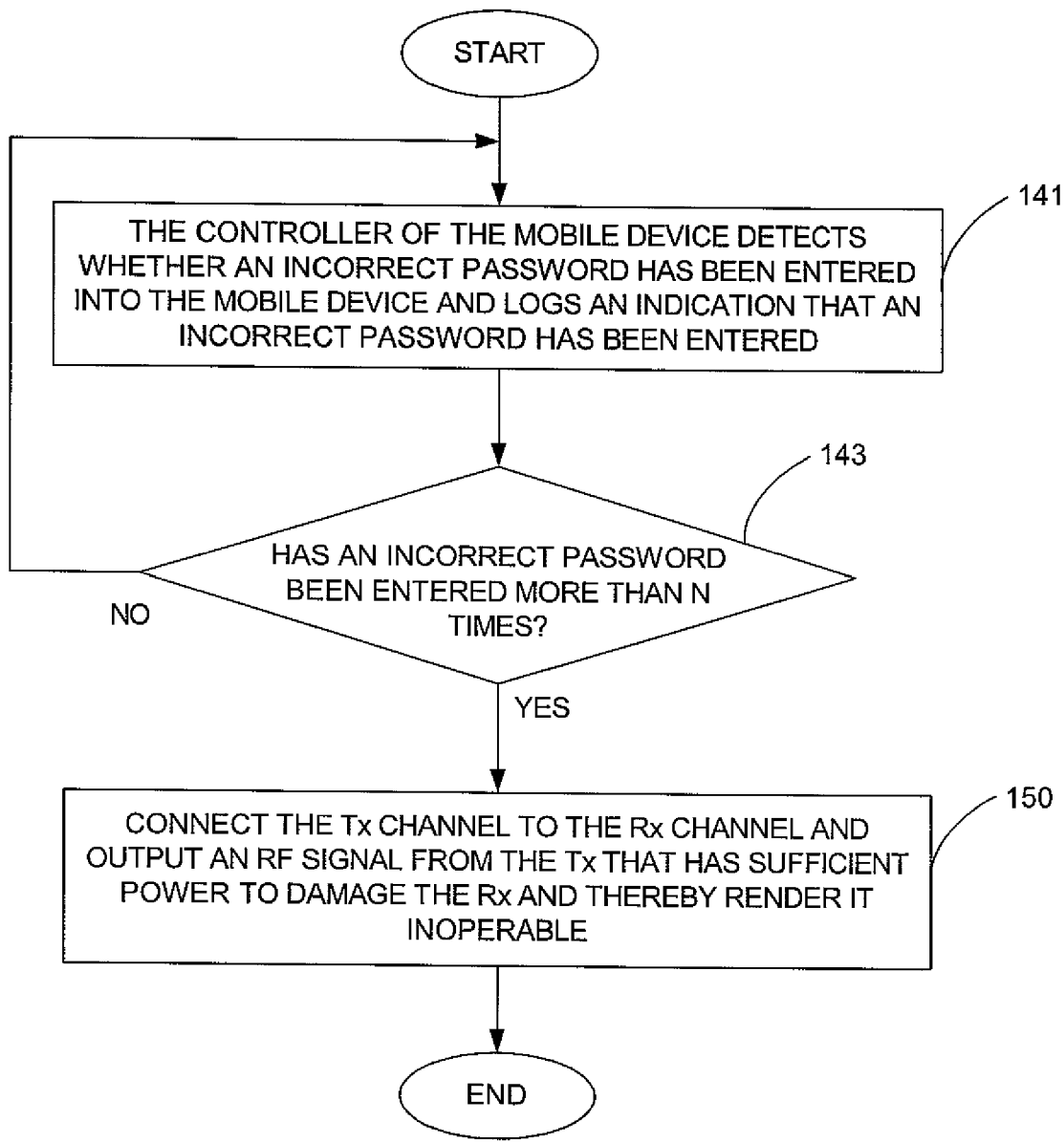
FIG. 4 illustrates a flowchart that represents the method of the invention in accordance with another illustrative embodiment in which the predetermined condition is a user entering an incorrect password on the mobile device more than a predetermined number of consecutive times.

FIG. 4 illustrates a flowchart that represents the method of the invention in accordance with another illustrative embodiment in which the predetermined condition is a user entering an incorrect password on the mobile device 1 more than a predetermined number of consecutive times. This embodiment will be described now with reference to FIGS. 1 and 4. In the step represented by block 141 in FIG. 4, the controller 30 detects if an incorrect password has been entered into the mobile device 1, e.g., via the keypad 54, and creates a log containing information indicating that an incorrect password has been entered. In the step represented by block 143, the controller 30 uses the information logged in the step represented by block 141 to determine whether an incorrect password has been entered more than N consecutive times. If not, the process returns to the step represented by block 141.

If at the step represented by block 143 the controller 30 determines that an incorrect password has been entered into the mobile device 1 more than N consecutive times, the controller 30 proceeds to block 150. At the step represented by block 150, the controller 30 causes the switch 40 to switch to the Destroy_Rx position in which terminals 1B and 2B are electrically connected to one another. This direct electrical connection causes the electrical circuitry of the Rx 10 to be damaged sufficiently to render the Rx 10 nonoperational.

As indicated above, when the switch 40 is switched to the Destroy_Rx position, the power level of the RF signal that is electrically coupled from the Tx 20 into the Rx 10 may or may not be sufficiently high to damage circuitry of the Rx 10 to the extent necessary to render it nonoperational, depending on the design of the mobile device 1. With reference again to FIG. 4, in the event that the power level of the RF signal is not sufficiently high when the switch 40 is initially switched to the Destroy_Rx position, the controller 30 will cause the APC circuit 21 to increase the power of the RF signal output from the Tx 20 until the power of the RF signal is sufficiently high to cause damage to the Rx 10 such that the Rx 10 is rendered nonoperational. Therefore, as part of the step represented by block 150, or as an additional optional step that is not shown in FIG. 4, the controller 30 determines whether the power level of the RF signal output from the Tx 20 is sufficiently high to render the Rx 10 nonoperational, and if not, causes the APC 21 to increase the power level of the RF signal to a level that is sufficiently high to damage the Rx 10 such that it is rendered nonoperational. As another alternative, the controller 30 may simply cause the APC 21 to increase the power level of the RF signal output from the Tx 20 until the RF signal is at its maximum power level to ensure that the RF signal has sufficient power to render the Rx 10 nonoperational.

The algorithms described above with reference to FIGS. 1-4 may be performed in the controller 30 solely in hardware or in a combination of hardware and software and/or firmware. While the embodiments described above use the controller 30 that functions as the CPU of the mobile device 1 to perform the algorithms of the invention, the algorithms of the invention may be performed in a processing device of the mobile device 1 other than the controller 30. Regardless of whether the algorithms are performed in the controller 30 or in some other processing device inside of the mobile device 1, the invention is not limited to using any particular type of processing device for this purpose. The processing device that is used to perform the algorithm may be, for example, a microprocessor, a microcontroller, an ASIC, a digital signal processor (DSP), a programmable gate array, a programmable logic array, etc. The memory device 50 may be any type of computer-readable medium, including, for example, a solid state memory device, such as for example, a random access memory (RAM) device, a read only memory (ROM) device, a programmable read only memory (PROM) device, an erasable programmable read only memory (EPROM) device, a flash memory device, etc. In the case where the algorithms of the invention described above with reference to FIGS. 1-4 are implemented in software and/or firmware, the corresponding computer code will be stored in the memory device 50 and accessed and executed by the controller 30 or by some other processing device of the mobile device 1.

It should be noted that the invention has been described with reference to a few illustrative embodiments for the purposes of demonstrating the principles and concepts of the invention. Persons of ordinary skill in the art will understand, in view of the description provided herein, that many modifications may be made to these embodiments and that all such modifications are within the scope of the invention. For example, additional functionality may be added to each of the algorithms represented by the flowcharts of FIGS. 2-4, as will be understood by persons of ordinary skill in the art, in view of the description provided herein. Likewise, persons of ordinary skill in the art will understand that many modifications may be made to the steps represented by the blocks in the flowcharts. Also, as indicated above, the invention is not limited to any particular type of mobile device having any particular functionality or to any particular type of network or communications protocol. As will be understood by persons of ordinary skill in the art in view of the description provided herein, these and other modifications to the embodiments described herein are within the scope of the invention.

What is claimed is:

1. A mobile device that is configurable to damage itself to prevent unauthorized use, the mobile device comprising:
   a receiver (Rx) configured to receive radio frequency (RF) signals transmitter over air from a wireless network, the Rx including receiver electrical circuitry that provides a receive channel for receiving the received RF signals;
   a transmitter (Tx) configured to output RF signals for transmission over air from the mobile device to the wireless network, the Tx including transmitter electrical circuitry that provides a transmit channel for outputting an RF signal to be transmitted over air from the mobile device to the wireless network;
   a memory device configured to store data and computer code;
   a switching circuit coupled to the receive channel of the Rx and to the transmit channel of the Tx, wherein the switching circuit is switchable between at least a first switching state in which the switching circuit is opened and a second switching state in which the switching circuit is closed, wherein in the second switching state, the transmit channel is electrically connected to the receive channel such that an RF signal output on the transmit channel is received on the receive channel with sufficient power to sufficiently damage at least part of the receiver electrical circuitry to thereby render the Rx inoperable;
   a processing device configured to perform at least one algorithm that controls the switching circuit, wherein said at least one algorithm determines whether or not a message received by the Rx from the wireless network includes an Rx destroy (Destroy_Rx) command; and
   wherein if said at least one algorithm determines that a message received by the Rx from the wireless network includes a Destroy_Rx command, the processing device causes the switching circuit to be switched to the second switching state.

2. The mobile device of claim 1, wherein the processing device is a main controller of the mobile device, and wherein computer code for implementing said at least one algorithm is stored in the memory device and accessed and executed by the controller.

3. A method for preventing unauthorized use of a mobile device, the method comprising:
   in a processing device of a mobile device, performing at least one algorithm that determines whether or not a message received by a receiver (Rx) of the mobile device from a wireless network includes an Rx destroy (Destroy_Rx) command; and
      if said at least one algorithm determines that a message received by the Rx of the mobile device from a wireless network includes a Destroy_Rx command, causing a switching circuit of the mobile device to be switched from a first switching state in which the switching circuit is open to a second switching state in which the switching circuit is closed;
   wherein the switching circuit is coupled to a receive channel of the Rx of the mobile device and to a transmit channel of a Tx of the mobile device; and
   wherein in the second switching state, the transmit channel is electrically connected to the receive channel such that an RF signal output on the transmit channel is received on the receive channel with sufficient power to sufficiently damage at least part of the receiver electrical circuitry to thereby render the Rx inoperable.

4. A non-transitory computer-readable medium having a computer program stored thereon for use in a processing device of a mobile device to prevent unauthorized use of the mobile device, the program comprising computer instructions stored on the computer-readable medium, the instructions comprising:
   a first set of instructions for performing at least a first algorithm in the mobile device to determine whether or not a message received by a receiver (Rx) of the mobile device from a wireless network includes an Rx destroy (Destroy_Rx) command, the mobile device including a switching circuit that is coupled to a receive channel of the Rx of the mobile device and to a transmit channel of a transmitter (Tx) of the mobile device, wherein the switching circuit is opened in a first switching state and is closed in a second switching state; and
   a second set of instructions for performing at least a second algorithm in the mobile device if the first set of instructions determines that a message received by the Rx of the mobile device from the wireless network includes a Destroy_Rx command;
   wherein the second algorithm causes the switching circuit of the mobile device to be switched from the first switching state to the second switching state, and wherein in the second switching state, the transmit channel is electrically connected to the receive channel such that a radio frequency (RF) signal output on the transmit channel is received on the receive channel with sufficient power to sufficiently damage at least part of electrical circuitry of the Rx to thereby render the Rx inoperable.

5. A wireless network configured to prevent an unauthorized user from using a mobile device, the network comprising:
   at least a first network element of the wireless network configured to perform at least a first algorithm that determines whether or not a mobile device has been reported to a provider of the wireless network as being lost or stolen;
   wherein if the first algorithm determines that a mobile device has been reported as being lost or stolen, said at least a first algorithm tags the particular mobile device as lost or stolen mobile by listing an International Mobile Equipment Identifier (IMEI) number associated with the mobile device on a list of IMEI numbers associated with mobile devices that have been reported lost or stolen; and
   at least a second network element of the wireless network configured to perform at least a second algorithm that causes an Rx destroy (Destroy_Rx) command to be sent from the wireless network to a mobile device that said at least a first algorithm has tagged as lost or stolen, wherein the Destroy_Rx command commands the particular mobile device to electrically connect a transmit channel of a transmitter (Tx) of the mobile device to a receive channel of a receiver (Rx) of the mobile device such that a radio frequency (RF) signal output on the transmit channel is received on the receive channel with sufficient power to sufficiently damage electrical circuitry of the Rx to thereby render the Rx inoperable.

6. The wireless network of claim 5, wherein the wireless network is a Global System for Mobile Communications (GSM) wireless network that implements a GSM protocol.

7. The wireless network of claim 5, wherein the wireless network is a Code Division Multiple Access (CDMA) wireless network that implements a CDMA protocol.

8. A method performed by a wireless network to prevent an unauthorized user from using a mobile device, the method comprising:
   in a first network element of the wireless network, performing at least a first algorithm that determines whether or not a mobile device has been reported to a provider of the wireless network as being lost or stolen;
   wherein if said at least a first algorithm determines that the mobile device has been reported lost or stolen, said at least a first algorithm tags the particular mobile device as lost or stolen mobile by listing an International Mobile Equipment Identifier (IMEI) number associated with the mobile device on a list of IMEI numbers associated with mobile devices that have been reported lost or stolen; and
   in a second network element of the wireless network, performing at least a second algorithm that causes an Rx destroy (Destroy_Rx) command to be sent from the wireless network to a mobile device that said at least a first algorithm has tagged as lost or stolen, wherein the Destroy_Rx command commands the particular mobile device to electrically connect a transmit channel of a transmitter (Tx) of the mobile device to a receive channel of a receiver (Rx) of the mobile device such that a radio frequency (RF) signal output on the transmit channel is received on the receive channel with sufficient power to sufficiently damage electrical circuitry of the Rx to thereby render the Rx inoperable.

9. The method of claim 8, wherein the wireless network is a Global System for Mobile Communications (GSM) wireless network that implements a GSM protocol.

10. The method of claim 8, wherein the wireless network is a Code Division Multiple Access (CDMA) wireless network that implements a CDMA protocol.

11. A non-transitory computer-readable medium having a computer program stored thereon for use in a wireless network to prevent unauthorized use of the mobile device, the program comprising computer instructions stored on the computer-readable medium, the instructions comprising:
   a first set of instructions for performing at least a first algorithm that determines whether or not a mobile device has been reported to a provider of the wireless network as being lost or stolen by determining whether or not an International Mobile Equipment Identifier (IMEI) number associated with the particular mobile device on a list of IMEI numbers associated with mobile devices that have been reported lost or stolen; and
   a second set of instructions for performing at least a second algorithm that causes an Rx destroy (Destroy_Rx) command to be sent from the wireless network to a mobile device that the fist algorithm has determined to be lost or stolen, wherein the Destroy_Rx command commands the particular mobile device to electrically connect a transmit channel of a transmitter (Tx) of the mobile device to a receive channel of a receiver (Rx) of the mobile device such that a radio frequency (RF) signal output on the transmit channel is received on the receive channel with sufficient power to sufficiently damage electrical circuitry of the Rx to thereby render the Rx inoperable.

12. The non-transitory computer-readable medium of claim 11, wherein the wireless network is a Global System for Mobile Communications (GSM) wireless network that implements a GSM protocol.

13. The non-transitory computer-readable medium of claim 11, wherein the wireless network is a Code Division Multiple Access (CDMA) wireless network that implements a CDMA protocol.

14. A mobile device that is configurable to damage itself to prevent unauthorized use, the mobile device comprising:
   a receiver (Rx) configured to receive radio frequency (RF) signals transmitter over air from a wireless network, the Rx including receiver electrical circuitry that provides a receive channel for receiving the received RF signals;
   a transmitter (Tx) configured to output RF signals for transmission over air from the mobile device to the wireless network, the Tx including transmitter electrical circuitry that provides a transmit channel for outputting an RF signal to be transmitted over air from the mobile device to the wireless network;
   an input device that allows a user to input information into the mobile device;
      a memory device configured to store data and computer code;
   a switching circuit coupled to the receive channel of the Rx and to the transmit channel of the Tx, wherein the switching circuit is switchable between at least a first switching state in which the switching circuit is opened and a second switching state in which the switching circuit is closed, wherein in the second switching state, the transmit channel is electrically connected to the receive channel such that an RF signal output on the transmit channel is received on the receive channel with sufficient power to sufficiently damage at least part of the receiver electrical circuitry to thereby render the Rx inoperable;
   a processing device configured to perform at least one algorithm that controls the switching circuit;
   wherein said at least one algorithm determines whether or not an incorrect password has been entered into the mobile device multiple consecutive times via the input device; and
   wherein if said at least one algorithm determines that an incorrect password has been entered into the mobile device multiple consecutive times, the processing device causes the switching circuit to be switched to the second switching state.

15. A method for preventing unauthorized use of a mobile device, the method comprising:
   in a processing device of a mobile device, performing at least one algorithm that determines whether or not an incorrect password has been entered into the mobile device multiple consecutive times via an input device of the mobile device; and
   if said at least one algorithm determines that an incorrect password has been entered into the mobile device multiple consecutive times via an input device of the mobile device, causing a switching circuit of the mobile device to be switched from a first switching state in which the switching circuit is open to a second switching state in which the switching circuit is closed, wherein the switching circuit is coupled to a receive channel of a receiver (Rx) of the mobile device and to a transmit channel of a transmitter (Tx) of the mobile device; and wherein in the second switching state, the transmit channel is electrically connected to the receive channel such that an RF signal output on the transmit channel is received on the receive channel with sufficient power to sufficiently damage at least part of electrical circuitry of the Rx to thereby render the Rx inoperable.

16. A non-transitory computer-readable medium having a computer program stored thereon for use in a processing device of a mobile device to prevent unauthorized use of the mobile device, the switching circuit being coupled to a receive channel of a receiver (Rx) of the mobile device and to a transmit channel of a transmitter (Tx) of the mobile device, the switching circuit being opened in a first switching state and closed in a second switching state, the program comprising computer instructions stored on the computer-readable medium, the instructions comprising:

a first set of instructions for performing at least a first algorithm in the mobile device to determine whether or not an incorrect password has been entered into the mobile device multiple consecutive times via an input device of the mobile device; and a second set of instructions for performing at least a second algorithm in the mobile device if the first set of instructions determines that an incorrect password has been entered into the mobile device multiple consecutive times via the input device of the mobile device, wherein the second algorithm causes a switching circuit of the mobile device to be switched from a first switching state to a second switching state, the transmit channel is electrically connected to the receive channel such that a radio frequency (RF) signal output on the transmit channel is received on the receive channel with sufficient power to sufficiently damage at least part of electrical circuitry of the Rx to thereby render the Rx inoperable.

17. A wireless network configured to prevent an unauthorized user from using a mobile device, the network comprising:

at least a first network element of the wireless network configured to perform at least a first algorithm that determines whether or not a mobile device has attempted, unsuccessfully, to access the wireless network more than predetermined number, N, of times within a predetermined time interval, T, where N is a positive integer and where T is a period of time in seconds;

wherein if said at least a first algorithm determines that the mobile device has attempted, unsuccessfully, to access the wireless network more than N times within T seconds, said at least a second algorithm causes the Destroy_Rx command to be sent from the wireless network to the particular mobile device;

at least a second network element of the wireless network configured to perform at least a second algorithm that causes an Rx destroy (Destroy_Rx) command to be sent from the wireless network to a mobile device that said at least a first algorithm has determined has attempted, unsuccessfully, to access the wireless network more than N times within T seconds, and wherein the Destroy_Rx command commands the particular mobile device to electrically connect a transmit channel of a transmitter (Tx) of the mobile device to a receive channel of a receiver (Rx) of the mobile device such that a radio frequency (RF) signal output on the transmit channel is received on the receive channel with sufficient power to sufficiently damage electrical circuitry of the Rx to thereby render the Rx inoperable.

18. A method performed by a wireless network to prevent an unauthorized user from using a mobile device, the method comprising:

in a first network element of the wireless network, performing at least a first algorithm that determines whether or not a mobile device has attempted, unsuccessfully, to access the wireless network more than predetermined number, N, of times within a predetermined time interval, T, where N is a positive integer and where T is a period of time in seconds; and in a second network element of the wireless network, performing at least a second algorithm that causes an Rx destroy (Destroy_Rx) command to be sent from the wireless network to a mobile device that said at least a first algorithm has determined has attempted, unsuccessfully, to access the wireless network more than N times within T seconds, wherein the Destroy_Rx command commands the particular mobile device to electrically connect a transmit channel of a transmitter (Tx) of the mobile device to a receive channel of a receiver (Rx) of the mobile device such that a radio frequency (RF) signal output on the transmit channel is received on the receive channel with sufficient power to sufficiently damage electrical circuitry of the Rx to thereby render the Rx inoperable.

19. A non-transitory computer-readable medium having a computer program stored thereon for use in a wireless network to prevent unauthorized use of the mobile device, the program comprising computer instructions stored on the computer-readable medium, the instructions comprising:

a first set of instructions for performing at least a first algorithm that determines whether or not a mobile device has attempted, unsuccessfully, to access the wireless network more than predetermined number, N, of times within a predetermined time interval, T, where N is a positive integer and where T is a period of time in seconds; and a second set of instructions for performing at least a second algorithm that causes an Rx destroy (Destroy_Rx) command to be sent from the wireless network to a mobile device that the fist algorithm has determined has attempted, unsuccessfully, to access the wireless network more than N times within T seconds, wherein the Destroy_Rx command commands the mobile device to electrically connect a transmit channel of a transmitter (Tx) of the mobile device to a receive channel of a receiver (Rx) of the mobile device such that a radio frequency (RF) signal output on the transmit channel is received on the receive channel with sufficient power to sufficiently damage electrical circuitry of the Rx to thereby render the Rx inoperable.

* * * * *